US008117605B2

(12) United States Patent
Lev et al.

(10) Patent No.: US 8,117,605 B2
(45) Date of Patent: Feb. 14, 2012

(54) METHOD AND APPARATUS FOR IMPROVING TRANSACTIONAL MEMORY INTERACTIONS BY TRACKING OBJECT VISIBILITY

(75) Inventors: Yosef Lev, Cambridge, MA (US); Jan-Willem Maessen, Somerville, MA (US); Mark S. Moir, Somerville, MA (US)

(73) Assignee: Oracle America, Inc., Redwood City, CA (US)

( * ) Notice: Subject to any disclaimer, the term of this patent is extended or adjusted under 35 U.S.C. 154(b) by 1568 days.

(21) Appl. No.: 11/311,506

(22) Filed: Dec. 19, 2005

(65) Prior Publication Data

US 2007/0150509 A1 Jun. 28, 2007

(51) Int. Cl.
*G06F 9/45* (2006.01)
(52) U.S. Cl. ........ 717/154; 717/116; 717/152; 717/159; 711/150; 718/106
(58) Field of Classification Search .................. None
See application file for complete search history.

(56) References Cited

U.S. PATENT DOCUMENTS

| | | | | |
|---|---|---|---|---|
| 6,487,714 | B1 * | 11/2002 | Azagury et al. | 717/116 |
| 6,530,079 | B1 * | 3/2003 | Choi et al. | 717/158 |
| 6,757,891 | B1 * | 6/2004 | Azagury et al. | 717/158 |
| 6,912,553 | B1 * | 6/2005 | Kolodner et al. | 707/206 |
| 7,954,100 | B1 * | 5/2011 | Garthwaite | 718/100 |
| 2001/0027445 | A1 | 10/2001 | Eichelsdoerfer et al. | |
| 2002/0120428 | A1 * | 8/2002 | Christiaens | 702/186 |
| 2003/0097360 | A1 | 5/2003 | McGuire et al. | |
| 2003/0212660 | A1 | 11/2003 | Kerwin et al. | |
| 2004/0088712 | A1 | 5/2004 | Hickson et al. | |
| 2004/0187115 | A1 | 9/2004 | Tremblay et al. | |
| 2004/0221272 | A1 * | 11/2004 | Wu et al. | 717/128 |
| 2005/0222946 | A1 | 10/2005 | Mulholland et al. | |
| 2007/0143741 | A1 * | 6/2007 | Harris | 717/121 |

OTHER PUBLICATIONS

Transactional Monitors for Concurrent Objects Adam Welc, Suresh Jagannathan, and Antony L. Hosking ECOOP 2004, LNCS 3086, pp. 518-541, 2004.*
Language Support for Lightweight Transactions Tim Harris Keir Fraser OOPSLA'03, Oct. 26-30, 2003, Anaheim, California, USA.*
Dynamic Optimization through the use of Automatic Runtime Specialization John Whaley Massachusetts Institute of Technology May 1999.*
Removing Unnecessary Synchronization in Java Jeff Bogda and Urs Holzle OOPSLA '99 Nov. 1999 Denver, CO, USA.*
Compositional Pointer and Escape Analysis for Java Programs John Whaley and Martin Rinard OOPSLA '99 Nov. 1999 Denver, CO, USA.*
Compile-Time Concurrent Marking Write Barrier Removal David Detlefs and V. Krishna Nandivada SMLI TR-2004-142 Dec. 2004.*

(Continued)

*Primary Examiner* — Emerson Puente
*Assistant Examiner* — Paul Mills
(74) *Attorney, Agent, or Firm* — Robert C. Kowert; Meyertons, Hood, Kivlin, Kowert & Goetzel, P.C.

(57) ABSTRACT

In a multi-threaded computer system that uses transactional memory, object fields accessed by only one thread are accessed by regular non-transactional read and write operations. When an object may be visible to more than one thread, access by non-transactional code is prevented and all accesses to the fields of that object are performed using transactional code. In one embodiment, the current visibility of an object is stored in the object itself. This stored visibility can be checked at runtime by code that accesses the object fields or code can be generated to check the visibility prior to access during compilation.

20 Claims, 3 Drawing Sheets

```
if (access-mode(r) == shared) then          ———— 502
    x = transactional read of r.a           ———— 504
    y = transactional read of r.b           ———— 506
    z = transactional read of y.c           ———— 508
else
    x = non-transactional read of r.a       ———— 510
    y = non-transactional read of r.b       ———— 512
    if (access-mode(y) == shared) then      ———— 514
        z = transactional read of y.c       ———— 516
    else
        z = non-transactional read of y.c   ———— 518
```

500

OTHER PUBLICATIONS

Effective Synchronization Removal for Java Erik Ruf Year of Publication: 2000.*

Escape Analysis in the Context of Dynamic Compilation and Deoptimization Thomas Kotzmann, Johannes Kepler and Hanspeter Mossenbock Jun. 2005.*

Escape Analysis for Java Jong-Deok Choi Mannish Gupta Mauricio Serrano Vugranam C. Sreedhar and Sam Midkiff Year of Publication: 1999.*

* cited by examiner

```
void FetchAndIncrement(Integer i) {
    atomic {
        i = i + 1;
    }
} class List {
    class Node {
        Integer value;
        Node next;
    }
    Node head;
    ...
    ConditionalIncrement(Integer minVal) {
        atomic {
            Node currNode=this.head;
            while (currNode != null) {
                if (currNode.value > minVal) FetchAndIncrement(currNode.value);
                currNode = currNode.next;
            }
        }
    }
}
```

FIG. 1

```
field_X_get() {
    if (this.access-mode() == local) {        ——— 202
        return this.X;                        ——— 204
    }
    else {
        atomic { return this.X; }             ——— 206
    }
}
                                          ↑
                                         200
```

*FIG. 2*

```
                                              300
                                             ↙
field_X_set(object Y) {
    if (this.access-mode() == local) {        ——— 302
        this.X = Y;                           ——— 304
    }
    else {
        if (Y.access-mode() == local) {       ——— 306
            Y.publish();                      ——— 308
        }
        atomic {                              ——— 310
            this.X = Y;                       ——— 312
        }
    }
}
```

*FIG. 3*

```
publish() {
    if (this.access-mode() == local) {          ——— 402
        this.access-mode() = shared;             ——— 404
        for each field f of this {               ——— 406
            publish (this.f)                     ——— 408
        }
    }
}
```
                                                    400

FIG. 4

```
if (access-mode(r) == shared) then              ——— 502
        x = transactional read of r.a           ——— 504
        y = transactional read of r.b           ——— 506
        z = transactional read of y.c           ——— 508
else
        x = non-transactional read of r.a       ——— 510
        y = non-transactional read of r.b       ——— 512
        if (access-mode(y) == shared) then      ——— 514
            z = transactional read of y.c       ——— 516
        else
            z = non-transactional read of y.c   ——— 518
```
500

FIG. 5

METHOD AND APPARATUS FOR IMPROVING TRANSACTIONAL MEMORY INTERACTIONS BY TRACKING OBJECT VISIBILITY

GOVERNMENT LICENSE RIGHTS

The U.S. government has a paid-up license in this invention and the right in limited circumstances to require the patent owner to license others on reasonable terms as provided for by the terms of Contract #NBCH3039002 awarded by the Defense Advance Research Project Administration (DARPA) Agency.

BACKGROUND

Writing scalable concurrent programs is a difficult task, because it requires reasoning about the interaction between different threads that may access the same objects. Therefore, present day software uses locks to control the synchronization required when objects are accessed by multiple threads. Unfortunately, the use of locks leads to several well known performance and software engineering problems. Coarse-grained locking results in poor program performance, while fine-grained locking requires careful reasoning about possible deadlocks and synchronization bottlenecks, thereby making program maintenance difficult.

"Transactional memory" is a concurrent programming tool that helps programmers write scalable concurrent programs using sequential code. With transactional memory, a programmer uses "transactions", which are code sections that appear to be executed atomically, that is, the code sections are executed as if there is no interleaving of the steps of one transaction with another transaction. The synchronization required to achieve this atomicity is transparent to the programmer, leaving them only the responsibility of specifying what code should be executed atomically, and not how the atomicity should be achieved.

Transactional memory can be implemented in hardware as hardware transactional memory (HTM), for example by simple additions to the hardware cache mechanisms of existing processors. While this latter HTM implementation should support transactions very efficiently, it is not robust: that is, it only supports transactions up to a fixed size, and some transactions would never be able to complete successfully. Moreover, the limitations of an HTM implementation are architecture-specific, which makes writing correct portable programs a difficult task.

Software transactional memory (STM) implementations on the other hand, can compensate for most of the HTM limitations, but are less efficient than HTM. Lately, a hybrid transactional memory (HyTM) implementation has also been suggested. The HyTM implementation uses STM only when HTM fails, or if it is not supported at all. In general, it appears that no widely available transactional memory implementation solely in hardware will be available in the near future.

All recent STM implementations have a fundamental problem in that STM cannot guarantee atomicity of a transaction if an object is accessed concurrently by both transactional code and regular, non-transactional read and write operations. That is, the atomicity of a transaction may be compromised if some of the memory locations the transactional code accesses are also concurrently accessed by non-transactional code.

One way around this difficulty is to require the programmer to keep track of which objects may be accessed by both transactional and non-transactional code. However, this will only result in more error-prone concurrent programs, eliminating the software engineering benefits promised by transactional memory. On the other hand, although STM implementations keep improving, it is not likely that it would be practical to replace all regular memory accesses with their transactional version, at least not until an efficient and robust transactional memory that is implemented purely in hardware is available.

SUMMARY OF THE INVENTION

In accordance with the principles of the invention, when an object may be visible to more than one thread, access by non-transactional code is prevented and all accesses to the fields of that object are performed using transactional code. Therefore, there can be no concurrent access to objects both by transactional and non-transactional code and atomicity of transactions can be preserved. However, objects that are accessed by only one thread can still be accessed by regular non-transactional read and write operations, thereby avoiding the overhead associated with transactional code.

One embodiment tracks the visibility of an object at runtime by storing special information called an "access-mode", for example, in the object header. At program runtime, when a field of that object is being accessed, the access-mode information is checked and, if necessary, the field is accessed using transactional code. In one implementation of this embodiment, get and set methods of an object are used to access all fields of that object at runtime. The get and set methods are modified to check the access-mode information and, based on that information, to use transactional or non-transactional code to access the object fields as appropriate.

In another embodiment, access-mode information checking can be performed by access code inserted into the program by a compiler during compilation. This implementation has the advantage that some optimizations can be performed by the compiler when this code is inserted.

BRIEF DESCRIPTION OF THE DRAWINGS

FIG. 1 is a code snippet that illustrates nested atomic code blocks.

FIG. 2 is a code snippet that illustrates a get( ) method constructed in accordance with the principles of the invention.

FIG. 3 is a code snippet that illustrates a set( ) method constructed in accordance with the principles of the invention.

FIG. 4 is a code snippet that illustrates a publish( ) method used in the set( ) method shown in FIG. 3.

FIG. 5 is a code snippet that illustrates eliminating selected object access-mode checks by making certain assumptions during compilation.

DETAILED DESCRIPTION

In order to operate with transactional memory, embodiments of the invention require that the transactional memory implementation support several basic operations. The first operation is a "begin" operation which starts a new transaction. A second set of operations are "read" and "write" operations that are used inside the scope of the transactions to access the memory transactionally. An "abort" operation is used to end a transaction by discarding all modifications performed during the transaction. A "commit" operation attempts to end a transaction and make all modifications performed during the transaction visible so it appears as if the modifications were performed atomically. The commit operation may fail, in which case the result is the same as if an abort operation has been performed. If the transactional memory implementation uses the aforementioned hybrid approach, than there might be two sets of such operations, one for the hardware implementation and one for the software implementation.

It is also a requirement that transactions can be nested in an obvious way that merges all inner transactions with the outermost one. Specifically, if a begin operation is being called by a thread that is already in the process of executing a transaction, then the invocation of that begin operation is ignored, as well as the corresponding commit operation. This implies that calling an abort operation inside a nested transaction aborts the outermost transaction. If a particular transactional memory implementation does not support this form of nested transactions, then this functionality can be imitated either by the compiler or by library code.

In one embodiment, "get" and "set" methods of an object are used to access all fields of that object. These get and set methods are generated by the compiler and enforce transactional behavior if they are called in the context of a transaction, for example, by calling the transactional read or write operations. The particular implementation discussed below assumes that the programming language used in the implementation has object-oriented characteristics in which an object is accessed by means of a reference to that object. In particular, objects are not protected from concurrent transactional and non-transactional access performed using a pointer referencing any part of the object other than that beginning of the object.

In the code snippets discussed below, it is also assumed that a programmer specifies program code that needs to be executed atomically by the transactional memory system by placing that code within a designated block, which for purposes of illustration is called an atomic{ . . . } code block. When it encounters the atomic{ . . . } or similar notation, the compiler treats the code contained therein as a transaction and automatically generates code that begins and ends that transaction and retries that transaction if it fails to commit (that is, the compiler generates code that begins a new transaction with the same content as the failed transaction). In HyTM implementations, the compiler may also be responsible for generating code that switches appropriately between the HTM and STM implementations. In a manner similar to transactions, atomic code blocks can also be nested. In this case, the same transaction executing the code of the outermost atomic block is used to execute the code in the atomic blocks nested inside it.

The code snippet shown in FIG. 1 demonstrates the use of atomic blocks to atomically increment a value stored in the nodes of a list if that value is larger than a predetermined threshold minVal. This code snippet could be written in any conventional object-oriented language, such as Java or C++.

This code snippet 100 shows a class definition 102 for the class List including a ConditionalIncrement{ } method 104 that atomically scans the list by setting a node variable currNode first to the head node (representing the first object field) of the list in line 110 and then invoking the get( ) method for the next field to sequentially retrieve the object fields. In line 112, if the current value stored in that field is greater than a predetermined value minVal, then the FetchAndIncrement{ } function 106 is called. The FetchAndIncrement{ } function 106 is used to atomically retrieve the value stored in the current field, increment the value and stored the incremented value back into the field. Since both the ConditionalIncrement{ } method 104 and the FetchAndIncrement{ } function 106 use atomic{ . . . } code blocks 108 and 114, this code snippet contains nested atomic blocks. Specifically, the atomic block 114 of the FetchAndIncrement{ } method 106 is nested in the surrounding atomic block 108 of the ConditionalIncrement{ } method 104. Therefore, the compiler will ignore the atomic block 114 of the FetchAndIncrement{ } function 106 and execute the ConditionalIncrement{ } method using a single transaction.

An object is said to have "local visibility" if that object is only visible to one thread. Otherwise, an object is said to have "shared visibility". For brevity, objects with local visibility and shared visibility will be referred to in the following discussion as "local" and "shared" objects, respectively. Trivial examples of local objects are objects that are allocated on the stack for a thread, or objects that were allocated by a thread but are not yet referenced by any shared object. Shared visibility is a recursive property so that once an object becomes shared, all objects referenced from it, directly or indirectly, also become shared as well.

In accordance with the principles of the invention, access to a shared object is performed using transactional code. On the other hand, while it is safe to access all objects transactionally, access to a local object can be done using non-transactional access code, which is typically much faster (especially when STM is involved) and reduces the chances of false conflicts which can occur when two transactions that do not access the same variables cannot be executed in parallel because of resource limitations of the transactional memory implementation. However, care must be taken to ensure that no object is concurrently accessed by both transactional and non-transactional code.

In order to prevent concurrent access, in one embodiment, access-mode information is maintained for each object. The access-mode information specifies whether attempts to access the fields of that object must use transactional code or can use either transactional or non-transactional code. The access-mode information can be stored, for example, in the object header, and is modified by only one thread. In this embodiment, there are two access-modes, local mode and shared mode. When a thread creates an object, that object is initially placed in local mode. As discussed below, the following invariant is maintained: if an object has shared visibility, then it is in shared mode.

In one embodiment, transactional access to the fields of an object can be achieved by accessing each field of an object only by means of conventional get and set methods for that object. The get and set methods are then modified so that they check the access-mode information of the object and, depending on its value, decide whether to enforce transactional behavior. A code snippet illustrating one embodiment of a get( ) method 200 for a field X of an object is shown in FIG. 2.

As mentioned previously, line 202 of this method retrieves and checks the access-mode information for that object using an appropriate method (access-mode( )) of the object. If the access-mode information indicates that the object is a local object, in line 204, a non-transactional read operation is used to retrieve the value of the field X. Alternatively, if, in line 202, it is determined that the object is not local, then in line 206, a transactional read operation is used to retrieve the value of the field X.

Similarly, FIG. 3 shows a code snippet 300 illustrating one embodiment of a set( ) method for a field X of an object that sets field X to reference object Y. As with the get( ) method illustrated in FIG. 2, line 302 of the set( ) method retrieves and checks the access-mode information for the object. If line 302 determines that the object is a local object then, in line 304, a non-transactional write operation is used to write a reference to object Y into field X.

However, if, in line 302, it is determined that the object is in shared mode, then the visibility of object Y must be checked in line 306. In particular, the code must maintain the invariant mentioned above: if an object has shared visibility, then it is in shared mode. Since shared visibility is recursive, all objects that are referenced by the shared object, including object Y, must also be in shared mode or must be placed in shared mode. Line 306 determines if the object Y is in local mode by retrieving the access information for object Y using an appropriate method in object Y and checking the retrieved information.

If a reference to a local object is stored in a shared object, the local object must be "published". The publication action consists of setting the access-mode of this local object to shared and then recursively publishing all objects referenced by this object. An object must also be published in some other cases, such as when a global/static object is created, or when a reference to an object is passed between threads using operating system support.

In the event that a determination has been made, in line 306, that the object Y is local, then the publication action is invoked in line 308. After the publication is complete or if object Y was already in shared mode, a reference to object Y is written to field X using transactional write operation as indicated in lines 310 and 312.

An illustrative publish( ) method 400 for an object, such as object Y, is shown in FIG. 4. In line 402, a determination is made whether the access-mode of the object is local using an appropriate access-mode( ) method of the object. If the object is shared, nothing further need be done. However, if the access-mode of the object is local, then in line 404 the access-mode of that object is changed to shared, again using an appropriate method (access-mode( )) of the object. Then, in lines 406 and 408, each field of the object is also recursively published using the same publish( ) method.

Note that the access-mode information for an object can always be accessed non-transactionally. When the object is local, then, by definition, there is only one thread that can access it. Alternatively, when the object is shared, then this information specifies that the object is in shared mode and cannot be modified again.

As FIGS. 2 and 3 show, the get( ) and set( ) methods of a local object access the fields of that object using non-transactional read and write operations. This is true even if these get( ) and set( ) methods are called from within a transactional code block, since no synchronization is required for accessing fields that are visible to only one thread. However, any modifications made to local objects during a transaction must still be reverted if the transaction ultimately aborts. This requirement should not introduce any new complication into the transactional memory implementation, because the transactional memory implementation should already support transactional access to local variables on the stack, which are treated in the same way. Of course, it will always be safe to access local objects with transactional code from within an atomic code block even if no such support is provided by the transactional memory implementation. Such an approach can still benefit from fast, simple access when the access is performed by non-transactional code outside of a transaction.

Publishing an object can be costly, because to publish an object referencing many other objects (for example, a large array), involves checking the access-mode of each of those other objects and publishing that object if it is in local mode. Even if an object has a small number of fields, that object might still point to a large data structure that is in local mode, such as a long linked list, and all the reachable objects on the list must be traversed and published if they are in local mode. Publication costs can also create additional problems. Since transactions are used to control access to shared objects, most publication actions will occur as part of a running transaction. The publication costs increase the running time of the transaction, in turn increasing the chance that the transaction will be aborted due to a conflict. Moreover, it is quite likely that, when such a transaction is retried, it will publish the same objects.

Thus, in additional embodiments, techniques can be used to control publication costs. One technique is to use a special method, called share( ), that explicitly publishes an object if the object is not in shared access-mode. This method can be called to publish an object before starting a transaction in which that object will be published (because a reference to it will be stored in a shared object), or to publish objects before they are stored into a local object (thereby avoiding the cost of recursively traversing a large linked structure). In another technique, a user might be permitted to allocate objects in which the access-mode information designates the objects as shared even though, at allocation time, the object is not actually visible to more than one thread. Any value stored into the fields of such an object will be published, even if those fields are written before the object actually becomes shared. This latter technique can be used with the aforementioned share( ) method.

In accordance with another embodiment, a local object can be placed into a mode called "shared content mode". The fields of objects in shared content mode can be accessed using non-transactional read and write operations as these objects are still local, but any local object that is referenced in the fields of a shared content mode object must have a shared access mode. Therefore, local objects are published before a reference to them is stored in a shared content mode object. Publishing a shared content mode object is a simple matter of changing its access-mode information from indicating shared content mode to indicating shared mode; it is not necessary to traverse its fields recursively. Thus, shared content mode can be used to eliminate traversal cost when dealing with large container objects.

Similarly, in yet another embodiment, instead of creating objects that are designated as being in shared mode, it is possible to create an object that is designated as initially being in shared content mode. The access-mode of this newly-constructed object can be changed from shared content mode to shared mode after its constructor method has completed, or the change from an access-mode of "shared content" to "shared" can be delayed until the object is actually published.

An object could explicitly be placed into shared content mode by a method, shareContent( ) or the behavior of an object in shared content mode could be the default behavior of the share( ) method, since the additional overhead of transitioning from the shared content mode to the shared mode is small. Another alternative is to place objects containing a large number of references (such as arrays) into shared content mode by default, since the overhead of publication would otherwise be unacceptable. In this case a special local( ) method could be used to declare to the system that such a large object is unlikely to be shared.

In still other embodiments, the costs of publishing objects can be reduced by not rolling back the effects of object publications that occur during a transaction that is aborted (called "sticky publication"). Ordinarily, all the effects of an aborted transaction are rolled back. However, it is quite likely that when an aborted transaction is retried, the objects in question will be published again. It may therefore be preferable not to roll back object publication. There are a number of ways to decide whether or not to roll back publication that occurs during an aborted transaction. One way would be to roll back publication if a user-level abort occurs during a transaction (indicating a transient inconsistency which must result in different control flow on successful retry), but not to roll back publication in case of simple conflict (where control flow on retry will presumably be the same). Alternatively, the programmer could declare whether publication will be rolled back if a particular transaction is aborted. Another alternative is to assign objects access-modes which require sticky publication for particular objects.

In still other embodiments, publication actions that are required during a transaction are deferred execution until just before a transaction commits. This delay takes advantage of the fact that the published objects will not actually become shared until the transaction commits. Until that point, the more efficient non-transactional code can be used to access fields in these objects. Deferring publication execution requires logging publication actions which occur during the transaction. The transaction commitment mechanism must then be augmented to read this publication log and execute the publication operations recorded in it.

If publication of objects is deferred during a transaction and then that transaction aborts, it is possible to simply delete the publication log and perform no publications at all. However, as described above, there is a good chance that these publications will be performed when the transaction is retried. Therefore, if a transaction aborts, the publication actions recorded in the log can be executed after the transaction aborts but before it is retried, thereby shifting the publication cost outside the transaction and reducing the chance of conflict on retry. Many of the same options used to decide whether or not to roll back the effects of publications that occur during an aborted transaction can be used in making this decision.

In accordance with the principles of the invention, another possible manner of increasing the efficiency of the inventive method is to reduce the cost of the access-mode check that occurs before each read and write operation. In particular, in the embodiment described above, the access-mode of an object is checked by get( ) and set( ) methods before any of its fields are accessed to guarantee that transactional and non-transactional accesses are not intermixed. For shared objects, compared to the overhead of a transactional memory system (especially STM), the overhead incurred by this access-mode check is relatively low. However, for an object in local mode, the access-mode check can represent the majority of the cost of a read or write operation.

Rather than using the get( ) and set( ) methods of an object to enforce the use of transactional code in appropriate situations as described above, in another embodiment, a compiler can instead be used to generate the code that checks the access mode and accesses the field appropriately. If a compiler is used, several properties of the invention can be used in order to spread the cost of the access-mode check over multiple access attempts. The first property is that an object in shared mode will remain in shared mode unless it is explicitly localized, as described below. A second property is that any reference obtained from an object in shared access-mode will itself be in shared access-mode. A third property is that the access-mode of an object in any local mode (including, for example, the aforementioned shared content mode) will only change as a result of a write operation executed by the currently executing thread, or as a result of a call to a special method, such as the share( ) method. Thus, the access-mode of any local object which might be reachable from an object which is published must be re-checked.

The aforementioned properties can be used by a compiler to eliminate object access-mode checks from selected portions of the program. This is illustrated in the code snippet 500 shown in FIG. 5. In line 502, the program checks the access-mode of object r. If the access-mode of object r is shared, then three transactional read operations in lines 504-508 are executed. Program lines 504 and 506 read the fields a and b of object r. The sequence of read operations 504-506 on the fields of object r only requires checking the access-mode of object r once, since the access-mode of object r is already known to be shared and, once shared, cannot be local. Since line 506 sets y to reference the same object referenced by field b of object r, and since r is in shared access mode, then, when line 508 is executed, y is referencing an object in shared access mode, and therefore must itself have a shared access-mode. Therefore, a read of field c of object y must also be transactional as noted in program line 508.

Alternatively, if, in program line 502, a check of the access-mode of object r indicates that object r is local, then the reads of the fields of object r in program lines 510 and 512 can both be carried out by non-transactional code. However, even though line 512 sets y to reference the same object referenced by the field b of the local object r, it is not known whether b is referencing a shared or a local object. Therefore, the access-mode of this object must be checked before accessing its field c, as indicated by line 514. Based on the result of that check, either a transactional read must be performed, as set forth in line 516, if the access-mode of object y is shared, or a non-transactional read of object y can be performed if the access-mode of object y is local, as set forth in line 518.

In effect, the compiler creates multiple versions of a code fragment which operates on multiple objects, each version specialized to a particular combination of the access-modes of the objects examined. This can even be done inter-procedurally, for example by compiling copies of a method specialized to different sharing patterns. The greatest benefit can be obtained if the compiler can move an access-mode check out of a program loop or a program recursion.

In addition, the results of classic static program analyses such as thread "escape" analysis can also be used to prove that certain objects will always have a particular access-mode so that access-mode checks on these objects can be eliminated entirely. Similarly, the results of a pointer analysis can be used to prove that publishing one object will not cause another object to be published, thus eliminating the need to re-check the access-mode of a local object after every publication event.

In accordance with another embodiment, selected objects can be designated as local access-mode only. If it is known that an object should not be a shared object, a programmer can prevent unintended publication of such an object, thereby reducing the possibility of unintended (and often difficult to debug) concurrency bugs. A designation of an object as local access-mode only also permits the program implementation to always avoid using more expensive transactional read and write operations to access that object. Objects can be designated as local access-mode only by using a special "always-local" access-mode designation, which identifies objects which must never be published. Any publication action on an object whose access-mode is always-local results in an error being signaled. Note that a local object which refers to another local object with an access-mode of "always-local" also cannot be published. However, if this reference is later overwritten, the local object may then be published. Thus, the referring object is not forced to be in an always-local access-mode as well.

An object can either be placed in an always-local mode when it is created, or be placed in this mode by a special method called alwaysLocal( ). Calling this latter method if the object is already in shared access-mode signals an error. Once in always-local mode, the access-mode cannot be changed again, for example by calls to a share( ) method or a shareContents( ) method. This fact can be used by the compiler when optimizing access-mode checks, for example, the access-mode of an object in always-local mode need never be checked again.

If a programmer specifically intends an object to always be local, a special type annotation can be used. In accordance with yet another embodiment, this can be accomplished by permitting the programmer to annotate selected variables, parameters, classes, fields and method results as "local". With this designation, the compiler can statically check that the data is not mistakenly exposed to concurrent update. These annotations provide a mechanism for library code to enforce object locality in its interface. To permit local data to interoperate with non-local libraries, a safe typecast between the two object types is required. This typecast can be achieved by combining static and dynamic checking. A method called withLocal( ) can be provided which takes a local object and returns the object with nonlocal type, after ensuring the object is in always local mode. In addition, the alwaysLocal( ) method can be given a local return type. Together, these methods provide a safe typecast between local and non-local types. The compiler will catch unintended mixing of local and non-local objects, preserving static checking where it is required. At runtime, mode checking will guarantee that local objects are not shared.

The embodiments discussed above share one important property: an object, once shared, remains shared for the rest of its lifetime. However, in practice, some objects are allocated in one thread and handed to another thread and these objects will never be referenced by more than one thread at a time. Similarly, objects can be placed into a collection, such as a stack, heap or queue, and later removed and processed locally by another thread. Once an object is no longer shared, it would be advantageous to use the more efficient non-transactional read and write operations rather than accessing the object using transactional read and write operations. Accordingly, additional embodiments deal with "re-localizing" objects.

The simplest way to localize an object is to simply copy its contents to a new object. Most languages provide facilities for copying objects. For example, in the Java™ programming language, the clone( ) method performs this function and the new object will be local to the copying thread. However, with this straightforward approach, copying overhead must be incurred even for objects that are already local. In order to avoid this extra overhead, another embodiment uses a method called localizes, which returns the original object if it is local, but returns a copy of that object if it is shared. This method eliminates the cost of copying an object if that object may not necessarily be shared.

In another embodiment, a conventional garbage collection algorithm can be used to localize objects. Most garbage collection algorithms are based upon object reachability. This fact can be exploited to localize shared objects. If the garbage collector algorithm determines that an object is reachable from only one thread, the garbage collection algorithm can be modified to place that object into local mode.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, access-mode information for objects might be stored in a separate lookup structure, such as a hash table. Further, methods other than the conventional get( ) and set( ) methods may used to check the access-mode of an object before accessing the fields of that object. The order of the process steps may also be changed without affecting the operation of the invention. Other aspects, such as the specific process flow, as well as other modifications to the inventive concept are intended to be covered by the appended claims.

What is claimed is:

1. A method for improving operations in an object-oriented, multithreaded computer system that uses transactional memory, the method comprising:

compiling a program by a compiler, the compiling including:

identifying at least one code fragment in the program which accesses a plurality of objects, wherein a respective access-mode is maintained for each object at runtime that indicates whether the corresponding object is certainly visible to only one thread;

creating multiple versions of the code fragment, wherein each version is specialized to a different sharing pattern or particular combination of the access-modes for the plurality of objects; and generating selection code for the code fragment that determines which of the multiple versions to execute at runtime;

executing the compiled program by a computer, the executing including:

in response to program execution reaching the selection code, checking the respective access-mode for each object in a subset of the objects and selecting one of the versions of the code fragment, wherein the selecting is dependent on the respective access-mode for each object in the subset of the objects; and executing the selected version of the code fragment, wherein any accesses to any of the plurality of objects which are certainly visible to only one thread are performed by the selected version of the code fragment using non-transactional program code.

2. The method of claim 1,
wherein said executing the compiled program further includes accessing, by program code other than the at least one code fragment, one or additional objects; and
wherein a respective access-mode is maintained for each of the one or more additional objects.

3. The method of claim 1, wherein the respective access-mode for each object is stored in the corresponding object.

4. The method of claim 3, wherein the respective access-mode for each object is stored in a header of the corresponding object.

5. The method of claim 2, wherein accessing one of the additional objects comprises:
using object access methods at runtime to check the respective access-mode for the additional object before accessing the additional object; and
determining whether non-transactional program code or transactional memory system code will be used to access the additional object dependent on the respective access-mode for the additional object.

6. The method of claim 1, wherein any accesses to any of the plurality of objects which may be visible to more than one thread are performed by the selected version of the code fragment using transactional memory system code.

7. The method of claim 1, wherein the access-mode for one of the objects in the subset of objects is usable to infer the access-mode for another object which is not included in the subset of the objects.

8. The method of claim 2, wherein accessing one of the additional objects comprises:
determining whether the additional object is certainly visible to only one thread; and
in response to determining that the additional object may be visible to more than one thread:
using transactional memory system code to access the additional object; and
in response to determining that accessing the additional object comprises writing to the additional object a reference to another object that is certainly visible to only one thread, publishing the another object.

9. The method of claim 8, wherein said publishing the another object comprises setting the access-mode information of the another object to indicate that the another object may be visible to more than one thread and then recursively publishing all objects referenced by the another object.

10. A non-transitory, computer-readable storage medium storing program instructions that when executed in a computer system that uses transactional memory cause the computer system to perform:
compiling a multi-threaded computer program, the compiling including:
identifying at least one code fragment in the program which accesses a plurality of objects, wherein a respective access-mode is maintained for each object at runtime that indicates whether the corresponding object is certainly visible to only one thread;
creating multiple versions of the code fragment, wherein each version is specialized to a different sharing pattern or particular combination of the access-modes for the plurality of objects; and
generating selection code for the code fragment that determines which of the multiple versions to execute at runtime;
executing the compiled program, the executing including:
in response to program execution reaching the selection code, checking the respective access-mode for each object in a subset of the objects and selecting one of the versions of the code fragment, wherein the selecting is dependent on the respective access-mode for each object in the subset of the objects; and
executing the selected version of the code fragment, wherein any accesses to any of the plurality of objects which are certainly visible to only one thread are performed by the selected version of the code fragment using non-transactional program code.

11. The storage medium of claim 10,
wherein said executing the compiled program further includes program code other than the at least one code fragment accessing one or additional objects; and
wherein a respective access-mode is maintained for each of the one or more additional objects.

12. The storage medium of claim 10, wherein the respective access-mode for each object is stored in the corresponding object.

13. The storage medium of claim 12, wherein the respective access-mode for each object is stored in a header of the corresponding object.

14. The storage medium of claim 11, wherein accessing one of the additional objects comprises:
using object access methods at runtime to check the respective access-mode for the additional object before accessing the additional object; and
determining whether non-transactional program code or transactional memory system code will be used to access the additional object dependent on the respective access-mode for the additional object.

15. The storage medium of claim 10, wherein any accesses to any of the plurality of objects which may be visible to more than one thread are performed by the selected version of the code fragment using transactional memory system code.

16. The storage medium of claim 10, wherein the access-mode for one of the objects in the subset of objects is usable to infer the access-mode for another object which is not included in the subset of the objects.

17. The storage medium of claim 11, wherein accessing one of the additional objects comprises:
determining whether the additional object is certainly visible to only one thread; and
in response to determining that the additional object may be visible to more than one thread:
using transactional memory system code to access the additional object; and
in response to determining that accessing the additional object comprises writing to the additional object a reference to another object that is certainly visible to only one thread, publishing the another object.

18. The storage medium of claim 17, wherein said publishing the another object comprises setting the access-mode information of the another object to indicate that the another object may be visible to more than one thread and then recursively publishing all objects referenced by the another object.

19. An apparatus, comprising:
a multithreaded computer system, including a processor, that uses transactional memory; and a non-transitory storage medium storing program instructions that when executed on the computer system cause the computer system to perform:
  compiling a computer program, the compiling including:
    identifying at least one code fragment in the program which accesses a plurality of objects, wherein a respective access-mode is maintained for each object at runtime that indicates whether the corresponding object is certainly visible to only one thread;
    creating multiple versions of the code fragment, wherein each version is specialized to a different sharing pattern or particular combination of the access-modes for the plurality of objects; and
    generating selection code for the code fragment that determines which of the multiple versions to execute at runtime;
  executing the compiled program, the executing including:
    in response to program execution reaching the selection code, checking the respective access-mode for each object in a subset of the objects and selecting one of the versions of the code fragment, wherein the selecting is dependent on the respective access-mode for each object in the subset of the objects; and
    executing the selected version of the code fragment, wherein any accesses to any of the plurality of objects which are certainly visible to only one thread are performed by the selected version of the code fragment using non-transactional program code.

20. The apparatus of claim 19,
  wherein said executing the compiled program further includes program code other than the at least one code fragment accessing one or additional objects;
  wherein a respective access-mode is maintained for each of the one or more additional objects ; and
  wherein accessing one of the additional objects comprises:
    using object access methods at runtime to check the respective access-mode for the additional object before accessing the additional object; and
    determining whether non-transactional program code or transactional memory system code will be used to access the additional object dependent on the respective access-mode for the additional object.

* * * * *